United States Patent Office 2,938,026
Patented May 24, 1960

2,938,026
CARBAMYLETHYL STARCH

James Regis Stephens and Lorence Rapoport, Stamford, Conn., assignors to American Cyanamid Company, New York, N.Y., a corporation of Maine No Drawing. Filed July 29, 1957, Ser. No. 674,604

2 Claims. (Cl. 260—233.3)

This invention relates to a new product, carbamylethyl starch and includes an improved process of preparing it.

Ordinary starch is often used in aqueous systems, such as a thickening agent, flocculating agent, and the like. For many of these purposes, ordinary starch is not well suited because it is not soluble in cold water and has to be boiled in order to effect a satisfactory aqueous dispersion. Various cold water soluble starches have been produced by chemical degradation of the starch, but they have certain disadvantages, such as caking, decomposition and other poor storage properties. We have found that carbamylethyl starch is cold water soluble, keeps extraordinarily well, does not cake, and in general is a superior cold water dispersible starch product. In general, the process involves reaction of starch with acrylamide in the presence of sodium hydroxide or other strong base as a catalyst. The starch carbamylethylates readily at moderately elevated temperatures, for example 50–70° C., and can be recovered after neutralization of the alkali by precipitation with methanol. The product is brittle and can be ground to a fine powder which on drying, keeps well without caking and is very soluble in cold water to give viscous solutions.

The carbamylethylation of starch is a reaction which proceeds in quite a different manner than reaction with acrylonitrile which produces cyanoethylation. In the latter case, increasingly drastic reaction conditions, time, acrylonitrile amounts, and the like, result in an increasing cyanoethylation as shown by nitrogen content. In the present invention, this does not hold. It is possible to introduce a relatively small amount of nitrogen varying from somewhat over 1% up to 2½ to 3% quite easily with only moderate hydrolysis of the amide groups. The reaction appears to take place almost exclusively with the single primary hydroxyl group of the anhydroglucose building block of the starch. The degree of hydrolysis is an important factor as excessive hydrolysis seriously affects the quality of the product. Of course the hydrolyzed groups which are transformed into COOH groups contain no nitrogen and therefore degree of substitution can not be measured exclusively by nitrogen percentage, as in the case of various cyanoethylated products. Throughout this specification and claims therefore, there will be used the expression "degree of substitution" which will be abbreviated as DS. This means the fraction of the primary hydroxyl groups of the starch molecule which have been substituted. A DS of greater than 1 indicates that a few of the secondary hydroxyl groups have also reacted. Since there is formed a carboxy group by a hydrolysis, there are 2 DS's, one for amide groups and the other for carboxy groups. Another concept of importance is the ratio of $CONH_2$ to COOH groups. In general, the latter should not be materially less than 5 and preferably, from 7 to 14 or more.

The DS total levels off at about 1, in other words, there is a negligible small reaction with secondary hydroxyl groups. There is a very definite limitation on nitrogen percentage which should not rise much above 5.6. This peculiar leveling off effect results in a need for controlling the time of reaction at a given temperature because if the time becomes long, there is but little additional substitution and the hydrolysis becomes much greater. If it is desired to have more carbamyl groups, this should be obtained by increasing the amount of acrylamide used which in general, should always be in excess.

The invention will be described in greater detail in conjunction with the specific examples in which the parts are by weight unless otherwise specified.

Example 1

Forty grams of pearl corn starch, corresponding to 0.247 mole of anhydroglucose residue, 17½ g. (0.247 mole) of acrylamide are added to a solution of 2 g. of sodium hydroxide in 166 cc. of water. A homogeneous slurry is obtained by stirring at room temperature and then heated past the swelling point of the starch to about 70° C. The temperature was maintained with continuous agitation for 30 minutes, thereupon the reaction was stopped by a neutralization with 2 N hydrochloric acid to a pH of about 3. It was then poured into a large volume of methanol. The coagulant separated and was triturated with several fresh portions of methanol until fairly brittle. Further purification can be effected by redissolution in water and reprecipitation with methanol. The final product was dried at 80° C. in an oven and then ground to a fine powder. The fine powder analyzed 2.6% nitrogen with a DS of carbamyl groups of 0.353 and of carboxyl groups of 0.0461. The ratio

was therefore 7.7. The product was readily soluble in cold water and showed excellent keeping qualities. It is useful for flocculation and as a thickening agent.

Example 2

The procedure of Example 1 was repeated increasing the time of reaction to more than 60 minutes. No additional DS of carbamyl groups resulted, but there was a very serious increase in hydrolysis and the

dropped below 5.

Example 3

The procedure of Example 2 was repeated increasing the amount of acrylamide to 1 mole. A product was obtained which had a DS of 0.915 for $CONH_2$ and 0.0663 for COOH. This gives a ratio $CONH_2$ to COOH of 14 and it should be noted that with the large excess of acrylamide the longer time did not result in significantly greater hydrolysis. Lengthening time in each case is significant only when the other conditions such as excess of acrylamide remain constant.

Example 4

The procedure of Example 3 was repeated doubling the amount of acrylamide to 2 moles. The DS for $CONH_2$ was only increased slightly to 1.17 and for COOH it was 0.05. The process was less sufficient as the losses of acrylamide were of course increased with a larger amount used.

We claim:

1. Carbamylethylated starch having both $CONH_2$ and COOH substituents and (a) from about one-third to about one primary hydroxyl group per anhydroglucose residue substituted by the carbamylethyl group; (b) a nitrogen content of from about one to about 5.6 weight percent; and (c) a ratio of $CONH_2$ to COOH not less than about five.

2. The process which comprises: adding to a dilute aqueous caustic alkali solution, a known weight of starch and an amount of acrylamide at least sufficient to provide an effective acrylamide to anhydroglucose residue initial-mol-ratio of at least one; subjecting resultant slurry to treatment by agitation at a treating temperature in the range of from about 50° C. to about 70° C., whereby substitution of hydroxyl groups in said starch by $CONH_2$ groups is initiated at a rate dependent upon said initial-mol-ratio and formation of COOH groups is initiated at a lower rate and whereby as treatment is continued the $CONH_2$ substitution rate decreases but the COOH formation rate remains substantially constant and whereby in resultant modified starch the nitrogen content increases at a decreasing rate and the $CONH_2$ to COOH ratio decreases; continuing said treatment until at least about one-third of said primary hydroxyl groups have been substituted; then stopping said treatment before said $CONH_2$ to COOH mol ratio decreases below about five; said effective initial-mol-ratio being at least one and also at least sufficiently high to produce said substitution of hydroxyl groups before reaction is stopped; and collecting resultant modified starch.

References Cited in the file of this patent

UNITED STATES PATENTS

| | | |
|---|---|---|
| 2,338,681 | Bock et al. | Jan. 4, 1944 |
| 2,618,633 | Vaughan | Nov. 18, 1952 |
| 2,618,635 | Vaughan | Nov. 18, 1952 |